(12) United States Patent
Poulsen

(10) Patent No.: US 6,823,277 B1
(45) Date of Patent: Nov. 23, 2004

(54) METHOD AND APPARATUS FOR INSTRUMENT CALIBRATION CONTROL

(75) Inventor: Andrew S. Poulsen, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/671,926

(22) Filed: Sep. 24, 2003

(51) Int. Cl.[7] .......................... G06G 19/00; G01L 25/00
(52) U.S. Cl. ........................................ 702/85; 702/105
(58) Field of Search ............................ 702/85, 87, 89, 702/105

(56) References Cited

U.S. PATENT DOCUMENTS 6,280,105 B1 * 8/2001 Iida ............................ 400/74

FOREIGN PATENT DOCUMENTS

JP          08122423 A  *  5/1996   ........... G01R/35/00

* cited by examiner

Primary Examiner—John Barlow
Assistant Examiner—Meagan S Walling

(57) ABSTRACT

Method and apparatus for controlling the calibration of an instrument. In a representative embodiment, a method includes determining instrument calibration status, wherein the determination is made automatically by the instrument examining calibration history data stored by the instrument. When instrument calibration is past due, a user is notified that the calibration is past due, wherein the notification is initiated automatically by the instrument. The user can decide to make the measurement with the out-of-calibration instrument. Otherwise, the instrument is removed from measurement service, the instrument is calibrated, the calibration history stored by the instrument is updated to reflect a new time that a new calibration is due, and the instrument is returned to measurement service. Also described are techniques for calibrating only those signal paths, subsystems, and ranges are actually being used or may potentially be used. In addition, if the user does decide to make a measurement while the instrument is out of calibration, he may be informed of the measurement uncertainty in making such a measurement.

36 Claims, 4 Drawing Sheets

METHOD AND APPARATUS FOR INSTRUMENT CALIBRATION CONTROL

BACKGROUND

In numerous environments, electronic instruments and systems are used for the measurement of parameters important in that environment. For example in developmental laboratories and in manufacturing facilities, electronic instruments can be used to measure the thicknesses of parts, machine alignments, signal frequencies, dielectric constants, optical parameters, etc. To ensure that the values obtained in these measurements are accurate, the instruments involved must be periodically calibrated.

For some companies, the accurate calibration of their instruments is so important that they employ a calibration system in which the calibration history of each instrument is centrally maintained. Further, the accuracy of the standards used in the calibration of the instruments are traceable to the National Institute of Standards and Technology. In some cases, the traceable standards used are maintained by the company's standards laboratory. To be National Institute of Standards and Technology traceable, there must be an unbroken chain of measurements from the instrument calibration to standards which are maintained by the National Institute of Standards and Technology.

Based on the calibration history of a particular instrument, the instrument may be physically removed from service, which could be a production floor, for calibration. Depending upon the timing of the calibration and the amount of time needed to perform the calibration, the removal of a particular instrument from active service may prevent the manufacturing operation from making a needed measurement or measurements in a timely manner. The lack of such a measurement or measurements may result in the manufacturing process drifting out of specification or alternatively a production line may be temporarily shut down until such calibration is completed.

Different companies maintain calibration programs with various degrees of success. At one end of the spectrum, some companies maintain very rigid, accurate calibration programs which are centrally controlled. When a particular instrument should be calibrated may be determined from a computer database. In other cases, a removable sticker which lists the calibration due date may be placed on the instrument. At the other extreme, other companies may seldom, if ever, perform calibrations. Even when calibrations are performed, it may be that they are completed against standards that are not traceable to the National Institute of Standards and Technology. Some companies may initiate comprehensive calibration programs but, with time, become overwhelmed by the complexity of maintaining the timely calibration of what may number in the hundreds of instruments.

SUMMARY

In a representative embodiment, a method includes determining instrument calibration status, wherein the determination is made automatically by the instrument examining calibration history data stored by the instrument. When instrument calibration is past due, a user is notified that the calibration is past due, wherein the notification is initiated automatically by the instrument. The user can decide to make the measurement with the out-of-calibration instrument. Otherwise, the instrument is removed from measurement service, the instrument is calibrated, the calibration history stored by the instrument is updated to reflect a new time that a new calibration is due, and the instrument is returned to measurement service. Additionally, when the instrument calibration due date is approaching, a user may be notified of that fact automatically by the instrument. Also described are techniques for calibrating only those signal paths, subsystems, and ranges are actually being used or may potentially be used. In addition, if the user does decide to make a measurement while the instrument is out of calibration, he may be informed of the measurement uncertainty in making such a measurement.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe embodiments of the invention and can be used by those skilled in the art to better understand those embodiments and their inherent advantages. In these drawings, like reference numerals identify corresponding elements.

DETAILED DESCRIPTION

Figure 1:
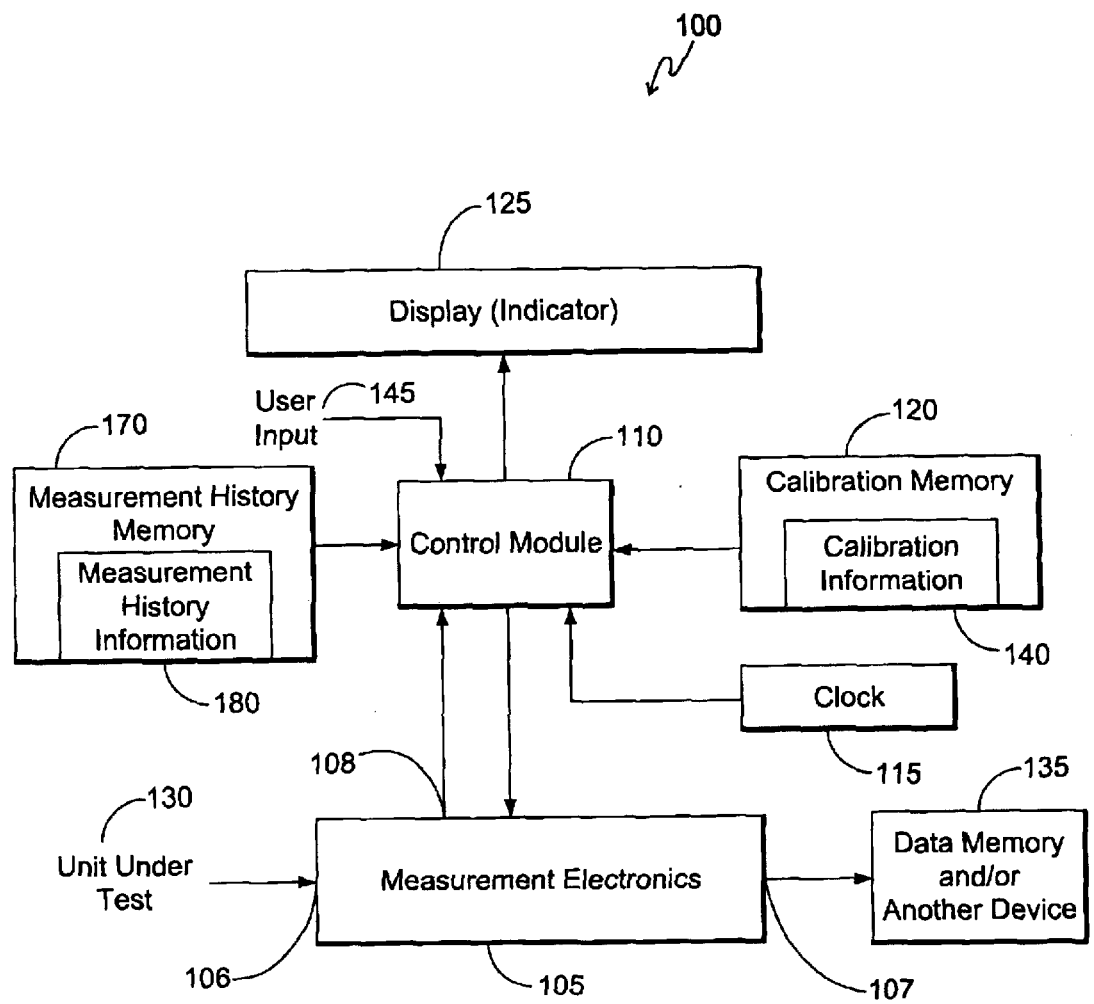
FIG. 1 is a drawing of an instrument system as described in various representative embodiments consistent with the teachings of the invention.

As shown in the drawings for purposes of illustration, the present patent document relates to novel techniques for controlling the calibration of measurement instruments. Previous methods for such control have relied upon various techniques including using centralized databases and removable stickers attached to individual instruments. If incorrectly implemented, these techniques may enable the use of out of calibration instruments for making measurements. Such a situation can result in inaccurate readings. In addition, keeping an instrument in active service with as little down time as possible for calibration is very important in modern production environments.

In the following detailed description and in the several figures of the drawings, like elements are identified with like reference numerals.

In the following a lock-out or warning method is disclosed that could be used with an instrument would be of value in preventing out of calibration instruments from being used in active service. The instrument itself or a system with which the instrument is in communication, could keep track of when the instrument had last been calibrated. In the event that an operator does wish to perform a measurement with an instrument that is out of calibration, the method can include the ability to override any lock-out or restriction that may have been imposed due to the instrument being out of calibration. Further, the operator can be informed of the likely uncertainty that will result from having performed the measurement should that measurement be taken even though the instrument is out of calibration.

In addition, representative embodiments reduce the time required to calibrate an instrument or system by tracking exactly which signal paths, subsystems, and ranges are actually being used or may potentially be used, allowing the person doing the calibration to calibrate ONLY that part of the instrument that is necessary. Additionally, these embodiments provide a safeguard against using non-calibrated signal paths, subsystems, or ranges by providing a warning if one of them is used. Advantages provided are as follows: (1) time is saved by not performing a fill instrument calibration, (2) the calibration control system is less prone to human error by not missing paths or ranges that need to be calibrated, or by not calibrating paths or ranges that will not be used, and (3) if a non-calibrated path or range is used, the user is informed of the fact that his measurement accuracy may be compromised and what the potential inaccuracy in his measurement will be if it is decided to take the measurement even though the instrument is out of calibration.

Ensuring that instruments and systems are in calibration when a measurement is made is becoming increasingly important. One of the key contributors to this efficiency is keeping the instruments and systems in an active mode.

Traditionally, a measurement instrument or system is periodically calibrated to ensure measurement accuracy. This calibration is done for the entire instrument or system (calibrating all signal paths and subsystems over their entire range of operation), and is typically quite time consuming. The instrument or system must be taken "offline" to do this calibration. If the instrument is being used in a manufacturing environment, taking it "offline" can potentially result in shutting down a part of that manufacturing process.

The application for which the instrument or system is used often utilizes only a portion of its full capability (not using some signal paths and/or subsystems, and/or not using the full range of the instrument's or system's capability), yet when the instrument is calibrated, ALL paths and ALL subsystems are calibrated, even those that are not being used, and the calibration is done over the ENTIRE range of the instrument's specified performance. This results in long calibration times (resulting in reduced efficiency of the manufacturing process while calibration is taking place).

To reduce the amount of time required for calibration, one solution is for the person doing the calibration to ask what the instrument or system is being used for, and calibrate only the paths or subsystems he feels will be used for that application, and possibly only calibrate a subset of the performance range specified for the instrument or system. While this procedure can significantly reduce calibration time, there are some distinct disadvantages to this approach: (1) the person doing the calibration may inadvertently calibrate unused signal paths, subsystems, or ranges (not harmful, but time consuming), (2) the person doing the calibration may NOT calibrate signal paths, subsystems, or ranges that ARE being used, thereby compromising measurement integrity, and (3) the user may use the instrument or system in a different application utilizing different signal paths, subsystems and/or ranges that have not been calibrated and the user will have no way of knowing that these paths, subsystems, or ranges have not been calibrated.

Representative embodiments reduce the amount of time required to calibrate an instrument or system by tracking which signal paths, subsystems, and ranges are actually being used, allowing the operator performing the calibration to calibrate only the signal paths, subsystems, or ranges that are necessary. Additionally, it provides a safeguard against using non-calibrated signal paths, subsystems, or ranges by providing a warning if one of these is used.

Previous solutions are more prone to human error, either missing paths or ranges that need to be calibrated, or calibrating paths or ranges that are not used. Also, if a non-calibrated path or range is used, the user has no way of knowing that their measurement accuracy may be compromised. Representative embodiments disclosed herein solve these problems.

Representative embodiments provide techniques for tracking which signal paths and measurement ranges in an instrument or system are being used, and the frequency of use. This is accomplished by the master controller in the instrument or system monitoring the measurements being taken.

One method of tracking and monitoring signal paths and measurement ranges is described in the following. When the instrument or system is first calibrated (either when it is manufactured or when it is installed), an internal table of "Electronic Calibration Stickers" is updated with a variety of information for each signal path over all measurement ranges of the instrument or system, including calibration date, date next calibration is required, etc. This information is updated at each subsequent calibration or service by the calibration or service software. When a measurement is taken, the master controller determines (using an internal look-up table) which signal paths are used by the measurement and which range is going to be used. The due date for calibration for each signal path at the required range is compared with the current date. If the calibration is still valid, the measurement proceeds, and an internal usage table (which keeps a count of how many times each signal path has been used at each range, both since last calibration and since last maintenance) is updated. This table may also keep track of when each signal path is used at each range, such as keeping a total by week or month for each signal path if the calibration is no longer valid. A warning is issued to the operator, and depending upon implementation details and configuration, the measurement may or may not be permitted to proceed.

During future calibrations, the user of the instrument or system may choose not to calibrate signal paths and ranges that have not been used or have only been used sparingly since the previous calibration, thereby reducing calibration time and associated costs.

Portions of the tracking functionality can be selectively disabled for those who do not desire it, running the gamut from full monitoring with "Electronic Calibrations Stickers" for each signal path/range combination to no monitoring with a single "Electronic Calibration Sticker" that indicates when the last full calibration was done and when the next one is due.

FIG. 1 is a drawing of an instrument system 100 as described in various representative embodiments consistent with the teachings of the invention. The instrument system 100 is also referred to herein as the instrument 100. In FIG. 1, the instrument system 100 comprises a measurement module 105, also referred to herein as measurement electronics 105, a control module 110, a clock 115, a calibration memory 120 which comprises calibration information 140, and a display 125. A value of a parameter associated with a unit under test 130 is detected at input 106 of measurement electronics 105. If the instrument is within its calibration cycle, i.e., it is in calibration, the measurement module 105 transposes the measured parametric value into an output signal which it can make available at data output 107. The output signal at data output 107 is an electronic signal representative of the parametric value which maybe stored in a data memory 135 as shown in FIG. 1, transferred to another electronic device or system, or otherwise used. Also, if the instrument is within its calibration cycle, the measurement module 105 transposes the measured parametric value into a display signal which it makes available to the control module 110 at display output 108, and which the control module 110 then transfers to the display 125.

When a measurement is made by the measurement electronics 105, the control module 110 obtains a time from the clock 115 which it compares with calibration information 140 stored in calibration memory 120 to determine whether or not the instrument is out of calibration, i.e., the clock time is later than a calibration due time. The calibration information 140 identifies the calibration due time for the instrument system 100. When the clock time obtained from the clock 115 is past the calibration due time obtained from the calibration information 140 stored in the calibration memory 120, the control module 110 can prevent the measurement electronics 105 from making a measurement. This prevention can be effected in one or more of several ways. For example, the signal from the unit under test 130 can be locked out or prevented from reaching all or part of the measurement electronics 105, the output signal at the data output 107 can be locked out or prevented from reaching the data output 107, and/or the signal at the display output 108 can be locked out or prevented from reaching the display 125. Further, the control module 11 can display on the display 125 a message indicating that the instrument is out of calibration. The lock out or restriction applied to the measurement electronics 105 can be overridden by input from the user 145 to the control module 110. If the instrument system 100 is controlled by another electronic system, a message can be sent to the controlling system indicating that instrument system 100 is out of calibration.

When a measurement(s) is made, a history of that event can be stored as measurement history information 180 which is stored in a measurement history memory 170. Control of this storage and retrieval of it is managed by the control module 110. User input 145 is also shown in FIG. 1 which could be, for example, instructions to the control module 110 to override the lock out placed on taking a measurement due to the instrument 100 being out of calibration. This user input can come from either a human user or a controlling system.

Figure 2:
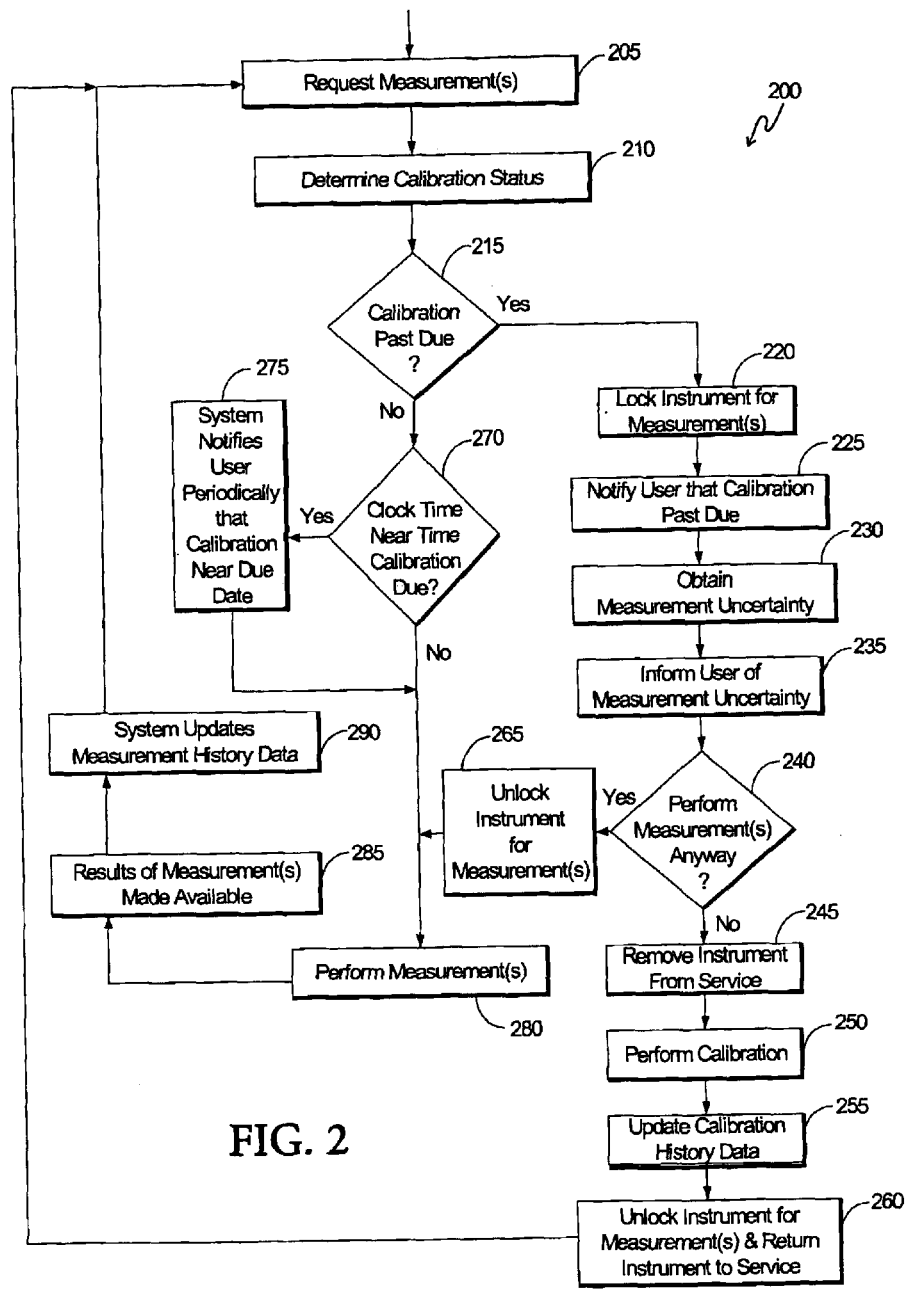
FIG. 2 is a flow chart of a method for controlling the calibration of the instrument as described in various representative embodiments consistent with the teachings of the invention.

FIG. 2 is a flow chart of a method 200 for controlling the calibration of the instrument 100 as described in various representative embodiments consistent with the teachings of the invention. In FIG. 2, a request is made in block 205 for the instrument 100 to make one or more measurements. This request could be in the form of a manual request by the operator, as for example pushing a button or flipping a switch on the instrument 100. It could also be actuated by a clock (i.e., at a preselected time or time interval) or by a preselected parameter attaining a preselected level. In addition, it could be actuated by a controlling electronic system. Block 205 then transfers control to block 210.

In block 210, instrument determines the calibration status for the instrument 100. This procedure has been described with respect to FIG. 1. Block 210 then transfers control to block 215.

When calibration of the instrument 100 is past due, block 215 transfers control to block 220. Otherwise, block 215 transfers control to block 270.

In block 220, the instrument 100 is locked with respect to making the measurement as was described in the discussion of FIG. 1. Block 220 then transfers control to block 225.

In block 225 the user is notified that the calibration is past due by, for example, displaying a notification to that affect on the display 125 of FIG. 1. In alternative embodiments, display 125 could be simply an indicator 125, as for example an indicator light 125. If an electronic system initiated the measurement request, a message can be sent to the controlling system that the calibration is past due. Block 225 then transfers control to block 230.

In block 230, the measurement uncertainty can be obtained knowing the time from the clock 115 and the calibration information 140 stored in the calibration memory 120. Measurement uncertainty is the most likely potential error in making a measurement with the instrument 100 when the instrument 100 has been out of calibration for a given time and is operated under preselected measurement conditions, as for example making a particular type of measurement at a particular frequency using a particular range of the instrument 100. The measurement uncertainty can be obtained from data in a table in the calibration information 140 and/or by performing a computation based on such data. Once the measurement uncertainty is obtained, block 230 transfers control to block 235.

In block 235, the user is informed of the measurement uncertainty should he decide to proceed with making the measurement. The notification could be sent to the display for a user-initiated measurement, or, if the measurement is initiated from an electronic system, the notification could be sent to the requesting system. Block 235 then transfers control to block 240.

When the user decides to perform the measurement(s) in spite of the fact that the instrument 100 is out of calibration, block 240 transfers control to block 265. Otherwise, block 240 transfers control to block 245.

In block 245, the instrument is removed from service. Block 245 then transfers control to block 250.

In block 250, the instrument is calibrated. Block 250 then transfers control to block 255.

In block 255, the calibration history which is a part of the calibration information 140 is updated in the calibration memory 120. Block 255 then transfers control to block 260.

In block 260, the instrument 100 is unlocked with respect to performing measurement(s) and the instrument is returned to service. Block 260 then transfers control to block 205.

In block 265, the instrument 100 is unlocked with respect to performing measurement(s). Block 265, then transfers control to block 280.

When the time the calibration is due is near the clock time, block 270 transfers control to block 275. In other words, when the instrument calibration due date is approaching, a user may be notified of that fact, wherein the notification is initiated automatically by the instrument. This proactive notification allows the user to schedule the calibration at a convenient time, thus minimizing or eliminating the cost of having the instrument out of service for calibration. Otherwise, block 270 transfers control to block 280.

In block 275, the instrument system 100 notifies the operator at preselected time(s) that the calibration due time is approaching. Block 275 then transfers control to block 280.

In block 280, the measurement(s) is performed. Block 280 then transfers control to block 285.

In block 285, the result of the measurement(s) in block 280 is made available at outputs 107,108 of the measurement module 105 as was noted in the discussion of FIG. 1. Block 285 then transfers control to block 290.

In block 290, measurement history data in the calibration memory 120 is updated.

Block 290 then transfers control to 205.

Figure 3:
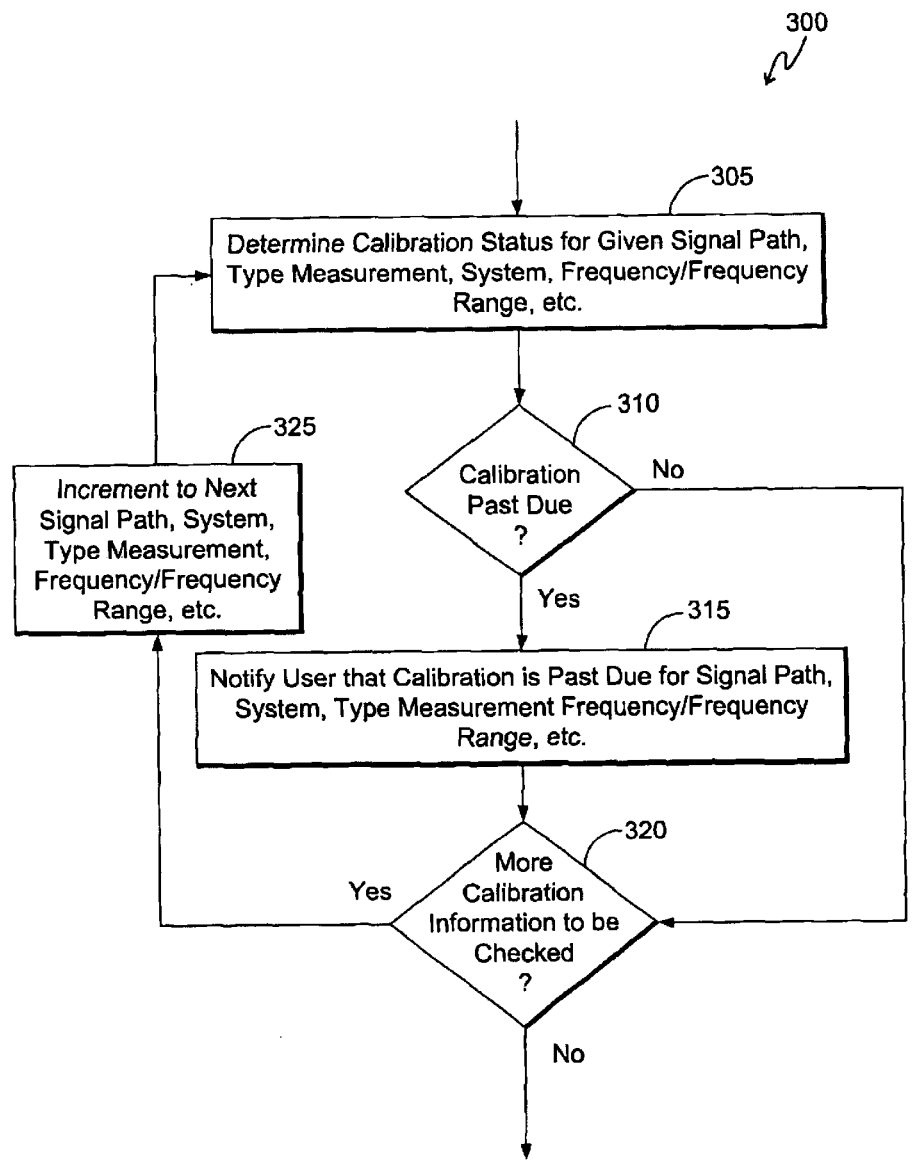
FIG. 3 is a flow chart of another method for controlling the calibration of the instrument system as described in various representative embodiments consistent with the teachings of the invention.

FIG. 3 is a flow chart of another method 300 for controlling the calibration of the instrument system 100 as described in various representative embodiments consistent with the teachings of the invention. In FIG. 3, block 305 determines the calibration status for a signal path, a type of measurement, and/or a particular frequency or frequency range. By performing a calibration only for specific signal path(s), subsystems, types of measurements (voltage, current, etc.), and frequencies/frequency bands for which it is anticipated that the instrument 100 will be used, the time required to calibrate the instrument 100 will be reduced. Block 305 then transfers control to block 310.

When the calibration is past due for the selected measurement conditions (signal path, subsystem, type measurement, frequency/frequency band, etc.), block 310 transfers control to block 315. Otherwise, block 310 transfers control to block 320.

In block 315, the user is notified that the calibration is past due for the selected measurement conditions (signal path, subsystem, type measurement, frequency/frequency band, etc.). If the measurement is requested by an electronic system, a message could be sent to the requesting system that the calibration is past due for the selected measurement conditions. Block 315 then transfers control to block 320.

When there are more selected measurement conditions (signal path, subsystem, type measurement, frequency/frequency band, etc.) to check, block 320 transfers control to block 325. Otherwise, block 320 terminates the process.

In block 325, the process increments to the next measurement condition (signal path, subsystem, type measurement, frequency/frequency band, etc.) to check. Block 325 then transfers control back to block 305.

As will be understood by those of ordinary skill in the art, various represented embodiments may not necessarily comprise all steps discussed above.

Figure 4:
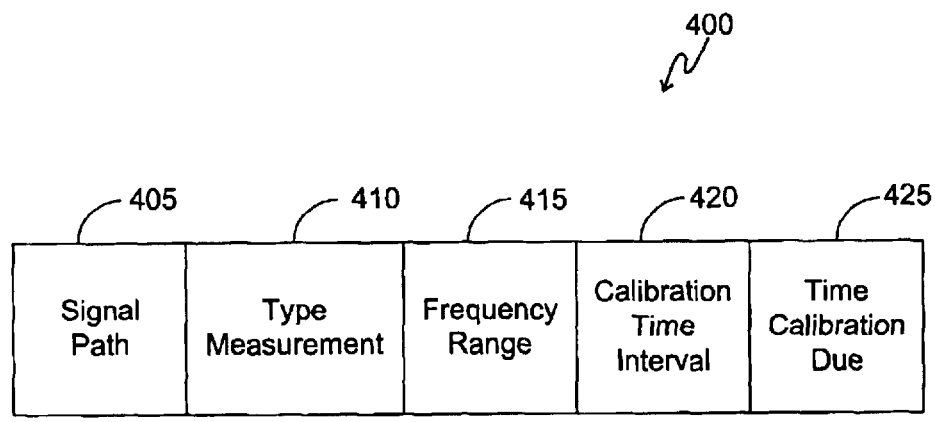
FIG. 4 is a drawing of a data structure for a record for calibration information for the instrument system as described in various representative embodiments consistent with the teachings of the invention.

FIG. 4 is a drawing of a data structure for a record 400 for calibration information 140 for the instrument system 100 as described in various representative embodiments consistent with the teachings of the invention. The record 400 for calibration information 140 is also referred to herein as the calibration information record 400. In the embodiment of FIG. 4, the calibration information record 400 comprises a signal path identification 405, a type measurement 410, a frequency range 415, a calibration time interval 420, and a time calibration due 425. In another representative embodiment, a specific frequency 415 or specific frequencies 415 replaces frequency range 415. In various embodiments, some of the components of the calibration information record 400 may not be present and in other embodiments other components may be present in the calibration information record 400. For example, the time of last calibration could replace the time calibration due 425.

Figure 5:
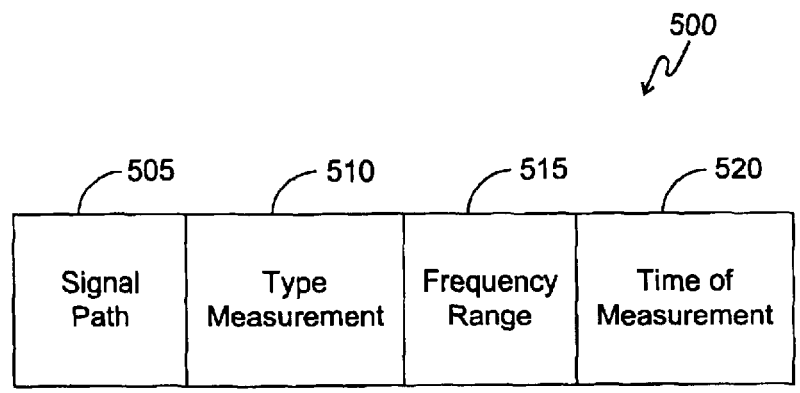
FIG. 5 is a drawing of a data structure for a record for measurement history information for the instrument system as described in various representative embodiments consistent with the teachings of the invention.

FIG. 5 is a drawing of a data structure for a record 500 for measurement history information 180 for the instrument system 100 as described in various representative embodiments consistent with the teachings of the invention. The record 500 for measurement history information 180 is also referred to herein as the measurement history record 500. In the embodiment of FIG. 5, the measurement history record 500 comprises a signal path identification 505, a type measurement 510, a frequency range 515, and a time of measurement 520. In another representative embodiment, a specific frequency 515 or specific frequencies 515 replaces frequency range 515. In various embodiments, some of the components of the measurement history record 500 may not be present and in other embodiments other components may be present in the measurement history record 500.

One skilled in the art will understand that there are numerous embodiments consistent with the teachings herein. In particular, representative embodiments are capable of automatically limiting use of the instrument 100 for cases in which the instrument 100 is out of calibration. This method comprises first determining the calibration status of the instrument 100, wherein the determination is made automatically by the instrument by examining an internal instrument flag. When the calibration of the instrument 100 is past due, the user or requesting system is notified of that fact. Such notification is initiated automatically by the instrument. At that point, the user has two choices (1) he can make the measurement anyway or (2) he can remove the instrument from measurement service. If he removes the instrument from service, the user then calibrates the instrument or has it calibrated (as many users of measurement instruments do not have the equipment or expertise to perform the calibration themselves), and the person performing the calibration updates an internal instrument flag to reflect the new calibration time. The instrument may then be returned to measurement service. Maintaining the instrument in measurement service is also an option.

Representative embodiments may further include the instrument automatically activating a restriction inhibiting the instrument from making a measurement before the user is notified that the calibration is past due. However, means for manually overriding the restriction is provided. After the calibration is performed and the internal instrument flag is updated to reflect the new calibration time, the measurement restriction is removed.

In a representative embodiment, the determination of instrument calibration status is initiated by comparison of a clock with a preselected clock time which species the calibration due time. In another representative embodiment, the determination of instrument calibration status is initiated by making a measurement.

In still another representative embodiment, after a user is notified that the calibration is past due, the measurement uncertainty is obtained, and the user is informed of the measurement uncertainty. Measurement uncertainty can be determined from numerous previous measurements by, for example, factory measurements at various times beyond the calibration due time.

The determination of instrument calibration status may comprise determining the calibration status for each of a sub-set of all measurement path of the instrument, wherein the sub-set of all measurement paths of the instrument comprises all measurement paths of the instrument, determining the calibration status for each of a sub-set of all types of measurements that the instrument can make, wherein the sub-set of all types of measurements comprises all types of measurements that the instrument can make, and/or determining the calibration status for each of a sub-set of all frequencies or frequency ranges for which the instrument is capable of making a measurements, wherein the sub-set of all frequencies or frequency ranges for which the instrument is capable of making a measurements comprises all frequencies or frequency ranges for which the instrument is capable of making measurements.

As is the case, in many data-processing products, the instrument measurement system 100 shown in FIG. 1 may be implemented as a combination of hardware and software components. Moreover, the functionality required for using the invention may be embodied in computer-readable media (such as, but not limited to, 3.5 inch floppy disks, conventional hard disks, DVD's, CD-ROM's, Flash ROM's, non-volatile ROM, Flash RAM, other nonvolatile RAM, and RAM) to be used in programming an information-processing apparatus (e.g., an instrument) to perform in accordance with the embodiments described herein.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A method for controlling the calibration of an instrument, comprising:
    determining instrument calibration status, wherein the determination is made automatically by the instrument examining calibration history data stored by the instrument; and
    when instrument calibration is past due:
        activating a restriction inhibiting the instrument from making a measurement, wherein the restriction is automatically activated by the instrument;
        notifying a user that the calibration is past due, wherein the notification is initiated automatically by the instrument; and
        when the user decides to make the measurement with the out-of-calibration instrument,
            manually overriding the restriction; and
            making the measurement;
        otherwise:
            removing the instrument from measurement service;
            calibrating the instrument;
            updating the calibration history stored by the instrument to reflect a new time that a new calibration is due;
            removing the restriction inhibiting the instrument from making a measurement; and
            returning the instrument to measurement service;
    otherwise:
        maintaining the instrument in measurement service.

2. The method as recited in claim 1, wherein the determination of instrument calibration status is initiated at a preselected clock time.

3. The method as recited in claim 1, wherein the determination of instrument calibration status is initiated by the step of making the measurement.

4. The method as recited in claim 1, further comprising:
    at preselected times prior to calibration due time for the instrument, notifying the user of calibration due time, wherein the notification is made automatically by the instrument.

5. A method for controlling the calibration of an instrument, comprising:
    determining instrument calibration status, wherein the determination is made automatically by the instrument examining calibration history data stored by the instrument; and
    when instrument calibration is past due:
        notifying a user that the calibration is past due, wherein the notification is initiated automatically by the instrument;
        obtaining the measurement uncertainty;
        informing the user of the measurement uncertainty; and
        when the user decides to make the measurement with the out-of-calibration instrument,
            making the measurement;
        otherwise:
            removing the instrument from measurement service;
            calibrating the instrument;
            updating the calibration history stored by the instrument to reflect a new time that a new calibration is due; and
            returning the instrument to measurement service;
    otherwise:
        maintaining the instrument in measurement service.

6. A method for controlling the calibration of an instrument, comprising:
    determining instrument calibration status, wherein the determination is made automatically by the instrument examining calibration history data stored by the instrument and wherein the step of determining instrument calibration status comprises determining the calibration status for only those paths belonging to a sub-set of all measurement paths of the instrument; and
    when instrument calibration is past due:
        notifying a user that the calibration is past due, wherein the notification is initiated automatically by the instrument; and
        when the user decides to make the measurement with the out-of-calibration instrument,
            making the measurement,
        otherwise:
            removing the instrument from measurement service;
            calibrating the instrument;
            updating the calibration history stored by the instrument to reflect a new time that a new calibration is due; and
            returning the instrument to measurement service;
    otherwise:
        maintaining the instrument in measurement service.

7. The method as recited in claim 6, wherein the step of calibrating the instrument comprises calibrating only those paths belonging to the sub-set of all measurement paths of the instrument.

8. The method as recited in claim 7, wherein the step of updating the calibration history stored by the instrument comprises updating the calibration history only for those paths belonging to the sub-set of all measurement paths of the instrument.

9. A method for controlling the calibration of an instrument, comprising:
    determining instrument calibration status, wherein the determination is made automatically by the instrument examining calibration history data stored by the instrument and wherein the step of determining instrument calibration status comprises determining the calibration status for only those types of measurements belonging to a sub-set of all measurement types that the instrument can make; and when instrument calibration is past due:
  notifying a user that the calibration is past due, wherein the notification is initiated automatically by the instrument; and
  when the user decides to make the measurement with the out-of-calibration instrument,
    making the measurement;
  otherwise:
    removing the instrument from measurement service;
    calibrating the instrument;
    updating the calibration history stored by the instrument to reflect a new time that a new calibration is due; and
    returning the instrument to measurement service;
otherwise:
  maintaining the instrument in measurement service.

10. The method as recited in claim 9, wherein the step of calibrating the instrument comprises calibrating only those types of measurements belonging to the sub-set of all measurement types that the instrument can make.

11. The method as recited in claim 10, wherein the step of updating the calibration history stored by the instrument comprises updating the calibration history only for those types of measurements belonging to the sub-set of all measurement types that the instrument can make.

12. A method for controlling the calibration of an instrument, comprising:
  determining instrument calibration status, wherein the determination is made automatically by the instrument examining calibration history data stored by the instrument and wherein the step of determining instrument calibration status comprises determining the calibration status for only frequencies belonging to a sub-set of all frequencies or frequency ranges for which the instrument is capable of making a measurement; and
  when instrument calibration is past due:
    notifying a user that the calibration is past due, wherein the notification is initiated automatically by the instrument; and
    when the user decides to make the measurement with the out-of-calibration instrument,
      making the measurement;
    otherwise:
      removing the instrument from measurement service;
      calibrating the instrument;
      updating the calibration history stored by the instrument to reflect a new time that a new calibration is due; and
      returning the instrument to measurement service;
  otherwise:
    maintaining the instrument in measurement service.

13. The method as recited in claim 12, wherein the step of calibrating the instrument comprises calibrating for only frequencies belonging to the sub-set of all frequencies or frequency ranges for which the instrument is capable of making a measurement.

14. The method as recited in claim 13, wherein the step of updating the calibration history stored by the instrument comprises updating the calibration history for only frequencies belonging to the sub-set of all frequencies or frequency ranges for which the instrument is capable of making a measurement.

15. A method for controlling the calibration of an instrument, comprising:
  determining instrument calibration status, wherein the determination is made automatically by the instrument examining calibration history data stored by the instrument; and
  when instrument calibration is past due:
    notifying a user that the calibration is past due, wherein the notification is initiated automatically by the instrument; and
    when the user decides to make the measurement with the out-of-calibration instrument,
      making the measurement;
    otherwise:
      removing the instrument from measurement service;
      obtaining measurement history data for the instrument, wherein the measurement history is stored by the instrument;
      calibrating the instrument;
      updating the calibration history stored by the instrument to reflect a new time that a new calibration is due; and
      returning the instrument to measurement service;
  otherwise:
    maintaining the instrument in measurement service.

16. The method as recited in claim 15, wherein the step of calibrating the instrument comprises calibrating those paths belonging to a sub-set of all measurement paths of the instrument that conform to a preselected measurement history profile.

17. The method as recited in claim 15, wherein the step of calibrating the instrument comprises calibrating those types of measurements belonging to a sub-set of all measurement types that the instrument can make that conform to a preselected measurement history profile.

18. The method as recited in claim 15, wherein the step of calibrating the instrument comprises calibrating those frequencies belonging to a sub-set of all measurement frequencies or frequency ranges for which the instrument is capable of making a measurement that conform to a preselected measurement history profile.

19. A computer readable memory device embodying a computer program of instructions executable by the computer, the instructions comprising:
  determining instrument calibration status, wherein the determination is made automatically by the instrument examining calibration history data stored by the instrument; and
  when instrument calibration is past due:
    activating a restriction inhibiting the instrument from making a measurement, wherein the restriction is automatically activated by the instrument;
    notifying a user that the calibration is past due, wherein the notification is initiated automatically by the instrument; and
    when the user decides to make the measurement with the out-of-calibration instrument,
      manually overriding the restriction; and
      making the measurement;
    otherwise:
      removing the instrument from measurement service;
      calibrating the instrument;
      updating the calibration history stored by the instrument to reflect a new time that a new calibration is due;

removing the restriction inhibiting the instrument from making a measurement; and
returning the instrument to measurement service;
otherwise:
maintaining the instrument in measurement service.

20. The computer readable memory device as recited in claim 19, wherein the determination of instrument calibration status is initiated at a preselected clock time.

21. The computer readable memory device as recited in claim 19, wherein the determination of instrument calibration status is initiated by the instruction of making the measurement.

22. The computer readable memory device as recited in claim 19, further comprising:
at preselected times prior to calibration due time for the instrument, notifying the user of calibration due time, wherein the notification is made automatically by the instrument.

23. A computer readable memory device embodying a computer program of instructions executable by the computer, the instructions comprising:
determining instrument calibration status, wherein the determination is made automatically by the instrument examining calibration history data stored by the instrument; and
when instrument calibration is past due:
notifying a user that the calibration is past due, wherein the notification is initiated automatically by the instrument;
obtaining the measurement uncertainty; and
informing the user of the measurement uncertainty;
when the user decides to make the measurement with the out-of-calibration instrument,
making the measurement;
otherwise:
removing the instrument from measurement service;
calibrating the instrument;
updating the calibration history stored by the instrument to reflect a new time that a new calibration is due; and
returning the instrument to measurement service;
otherwise:
maintaining the instrument in measurement service.

24. A computer readable memory device embodying a computer program of instructions executable by the computer, the instructions comprising:
determining instrument calibration status, wherein the determination is made automatically by the instrument examining calibration history data stored by the instrument and wherein the instruction of determining instrument calibration status comprises determining the calibration status for only those paths belonging to a sub-set of all measurement paths of the instrument; and
when instrument calibration is past due:
notifying a user that the calibration is past due, wherein the notification is initiated automatically by the instrument; and
when the user decides to make the measurement with the out-of-calibration instrument,
making the measurement;
otherwise:
removing the instrument from measurement service;
calibrating the instrument;
updating the calibration history stored by the instrument to reflect a new time that a new calibration is due; and
returning the instrument to measurement service;
otherwise:
maintaining the instrument in measurement service.

25. The computer readable memory device as recited in claim 24, wherein the instruction of calibrating the instrument comprises calibrating only those paths belonging to the sub-set of all measurement paths of the instrument.

26. The computer readable memory device as recited in claim 25, wherein the instruction of updating the calibration history stored by the instrument comprises updating the calibration history only for those paths belonging to the sub-set of all measurement paths of the instrument.

27. A computer readable memory device embodying a computer program of instructions executable by the computer, the instructions comprising:
determining instrument calibration status, wherein the determination is made automatically by the instrument examining calibration history data stored by the instrument and wherein the instruction of determining instrument calibration status comprises determining the calibration status for only those types of measurements belonging to a sub-set of all measurement types that the instrument can make; and
when instrument calibration is past due;
notifying a user that the calibration is past due, wherein the notification is initiated automatically by the instrument; and
when the user decides to make the measurement with the out-of-calibration instrument,
making the measurement,
otherwise:
removing the instrument from measurement service;
calibrating the instrument;
updating the calibration history stored by the instrument to reflect a new time that a new calibration is due; and
returning the instrument to measurement service;
otherwise:
maintaining the instrument in measurement service.

28. The computer readable memory device as recited in claim 27, wherein the instruction of calibrating the instrument comprises calibrating only those types of measurements belonging to the sub-set of all measurement types that the instrument can make.

29. The computer readable memory device as recited in claim 28, wherein the instruction of updating the calibration history stored by the instrument comprises updating the calibration history only for those types of measurements belonging to the sub-set of all measurement types that the instrument can make.

30. A computer readable memory device embodying a computer program of instructions executable by the computer, the instructions comprising:
determining instrument calibration status, wherein the determination is made automatically by the instrument examining calibration history data stored by the instrument and wherein the instruction of determining instrument calibration status comprises determining the calibration status for only frequencies belonging to a sub-set of all frequencies or frequency ranges for which the instrument is capable of making a measurement; and when instrument calibration is past due:
  notifying a user that the calibration is past due, wherein the notification is initiated automatically by the instrument; and
  when the user decides to make the measurement with the out-of-calibration instrument,
    making the measurement;
  otherwise:
    removing the instrument from measurement service;
    calibrating the instrument;
    updating the calibration history stored by the instrument to reflect a new time that a new calibration is due; and
    returning the instrument to measurement service;
  otherwise:
    maintaining the instrument in measurement service.

31. The computer readable memory device as recited in claim 30, wherein the instruction of calibrating the instrument comprises calibrating for only frequencies belonging to the sub-set of all frequencies or frequency ranges for which the instrument is capable of making a measurement.

32. The computer readable memory device as recited in claim 31, wherein the instruction of updating the calibration history stored by the instrument comprises updating the calibration history for only frequencies belonging to the sub-set of all frequencies or frequency ranges for which the instrument is capable of making a measurement.

33. A computer readable memory device embodying a computer program of instructions executable by the computer, the instructions comprising:
  determining instrument calibration status, wherein the determination is made automatically by the instrument examining calibration history data stored by the instrument; and
  when instrument calibration is past due:
    notifying a user that the calibration is past due, wherein the notification is initiated automatically by the instrument; and
    when the user decides to make the measurement with the out-of-calibration instrument,
      making the measurement;
    otherwise:
      removing the instrument from measurement service;
      obtaining measurement history data for the instrument, wherein the measurement history is stored by the instrument;
      calibrating the instrument;
      updating the calibration history stored by the instrument to reflect a new time that a new calibration is due; and
      returning the instrument to measurement service;
  otherwise:
    maintaining the instrument in measurement service.

34. The computer readable memory device as recited in claim 33, wherein the step of calibrating the instrument comprises calibrating those paths belonging to a sub-set of all measurement paths of the instrument that conform to a preselected measurement history profile.

35. The computer readable memory device as recited in claim 33, wherein the step of calibrating the instrument comprises calibrating those types of measurements belonging to a sub-set of all measurement types that the instrument can make that conform to a preselected measurement history profile.

36. The computer readable memory device as recited in claim 33, wherein the step of calibrating the instrument comprises calibrating those frequencies belonging to a sub-set of all measurement frequencies or frequency ranges for which the instrument is capable of making a measurement that conform to a preselected measurement history profile.

* * * * *

UNITED STATES PATENT AND TRADEMARK OFFICE
CERTIFICATE OF CORRECTION

PATENT NO.    : 6,823,277 B1
DATED         : November 23, 2004
INVENTOR(S)   : Andrew S. Poulsen It is certified that error appears in the above-identified patent and that said Letters Patent is hereby corrected as shown below:

<u>Column 3,</u>
Line 20, before "instrument", delete "fill" and insert -- full --

Signed and Sealed this

Twenty-ninth Day of March, 2005

JON W. DUDAS
*Director of the United States Patent and Trademark Office*